Figure 9:
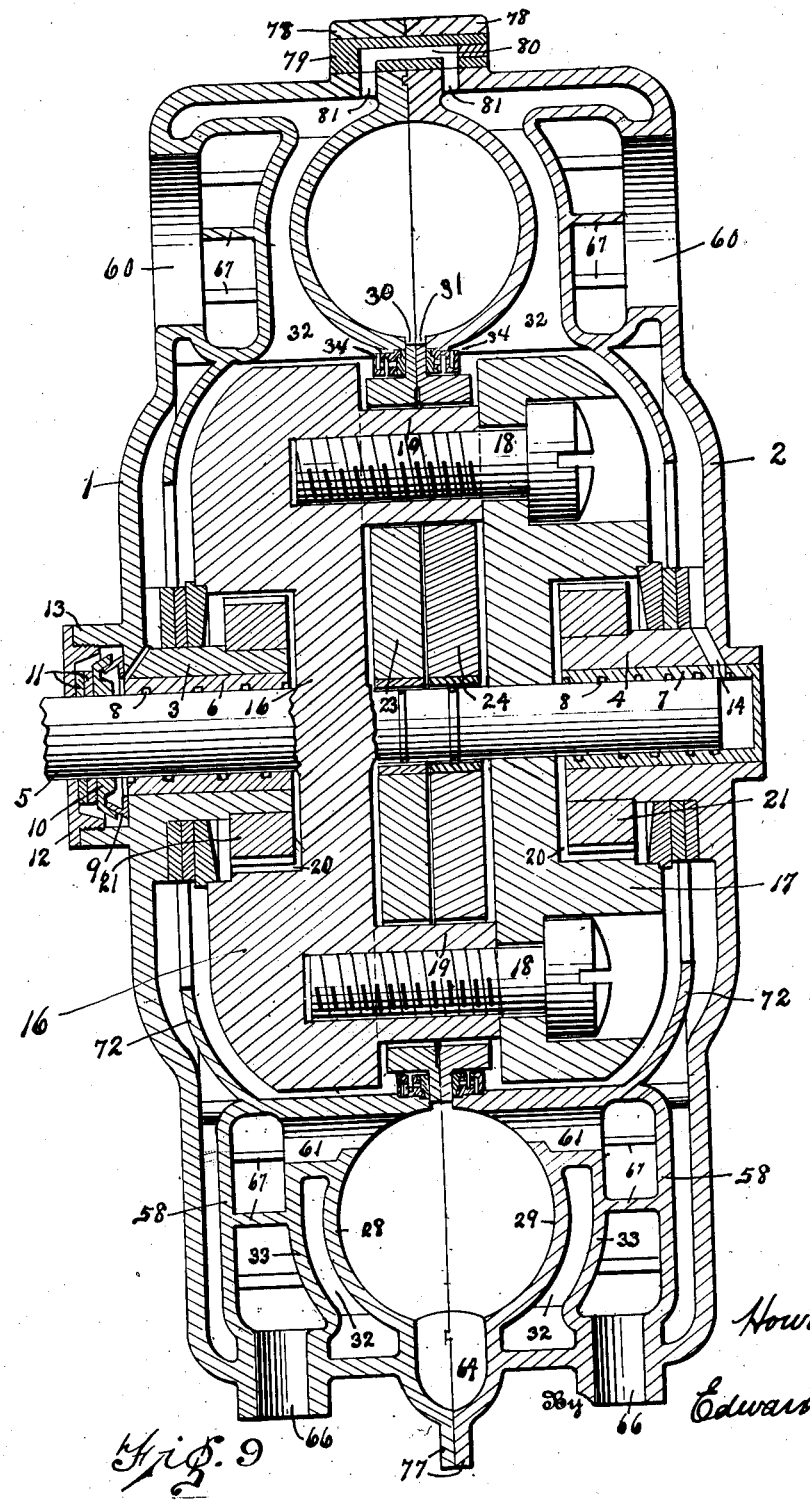

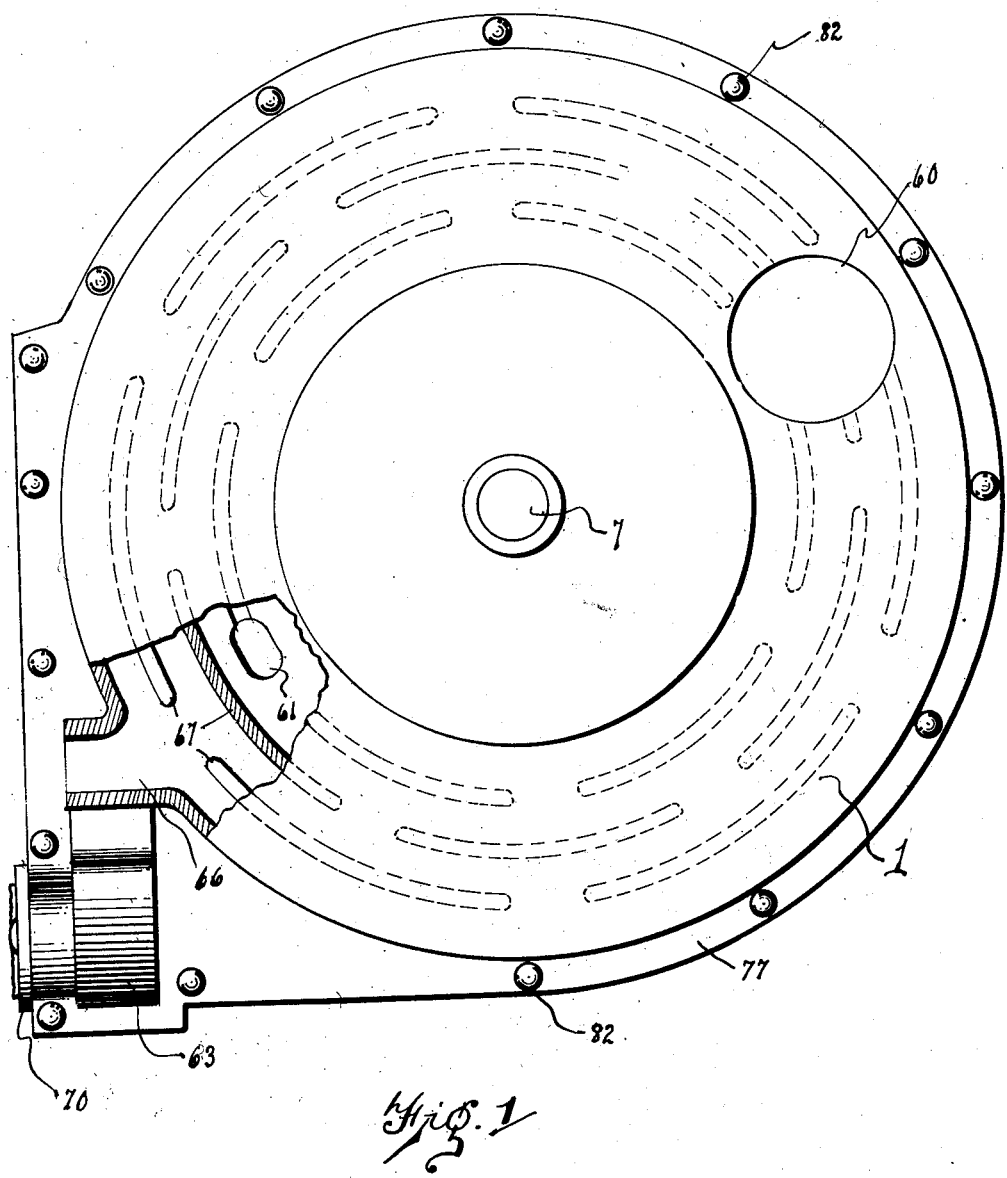

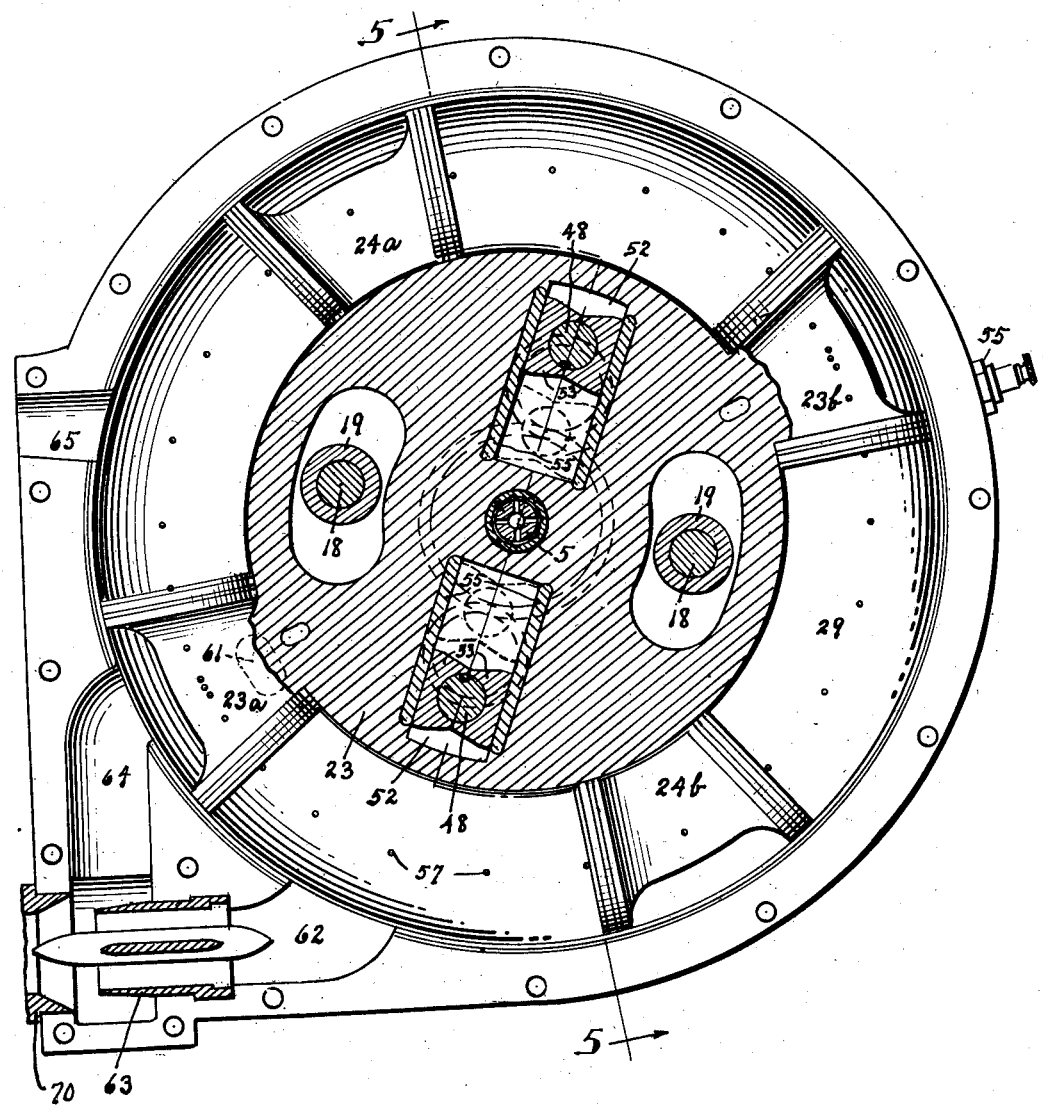

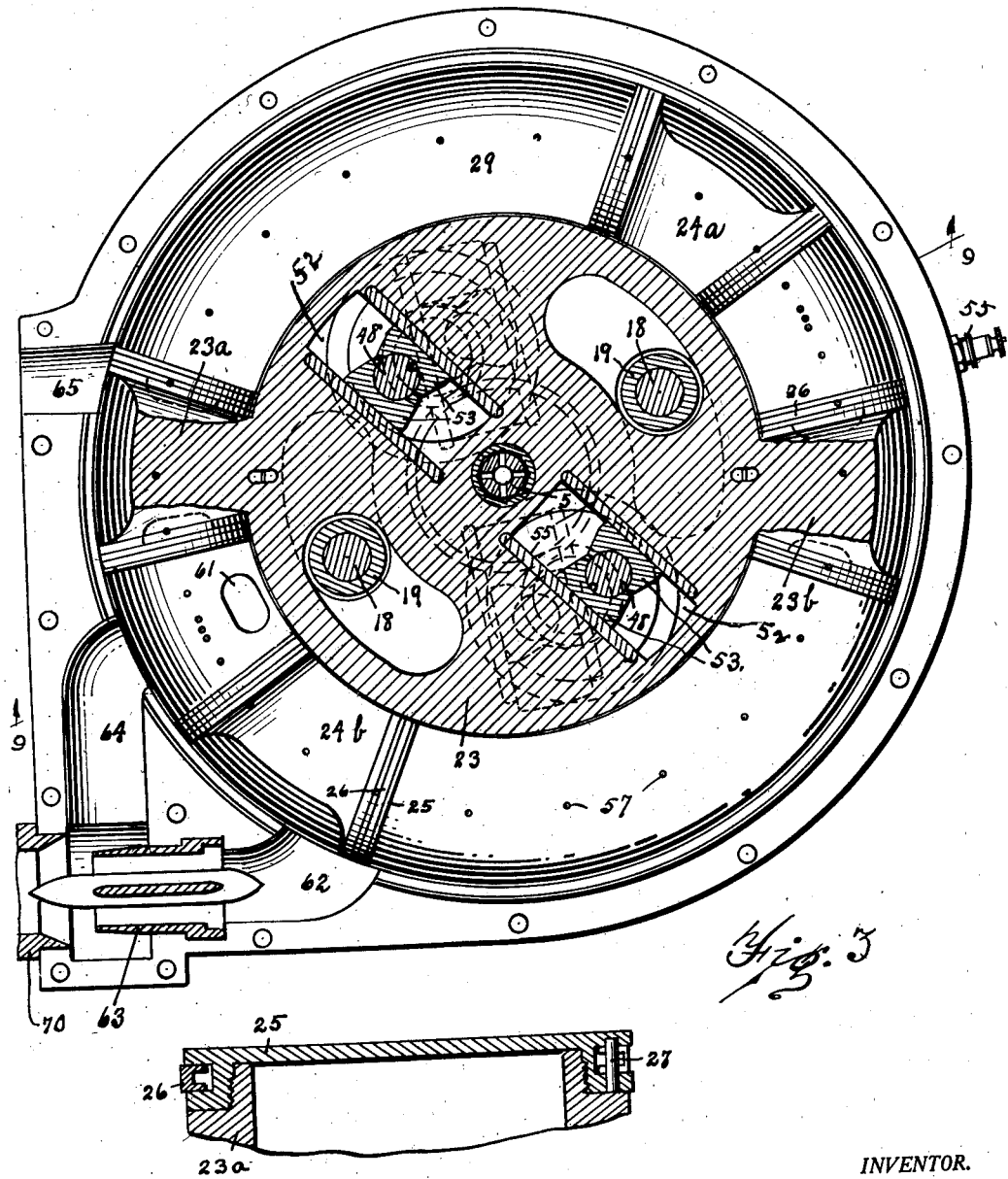

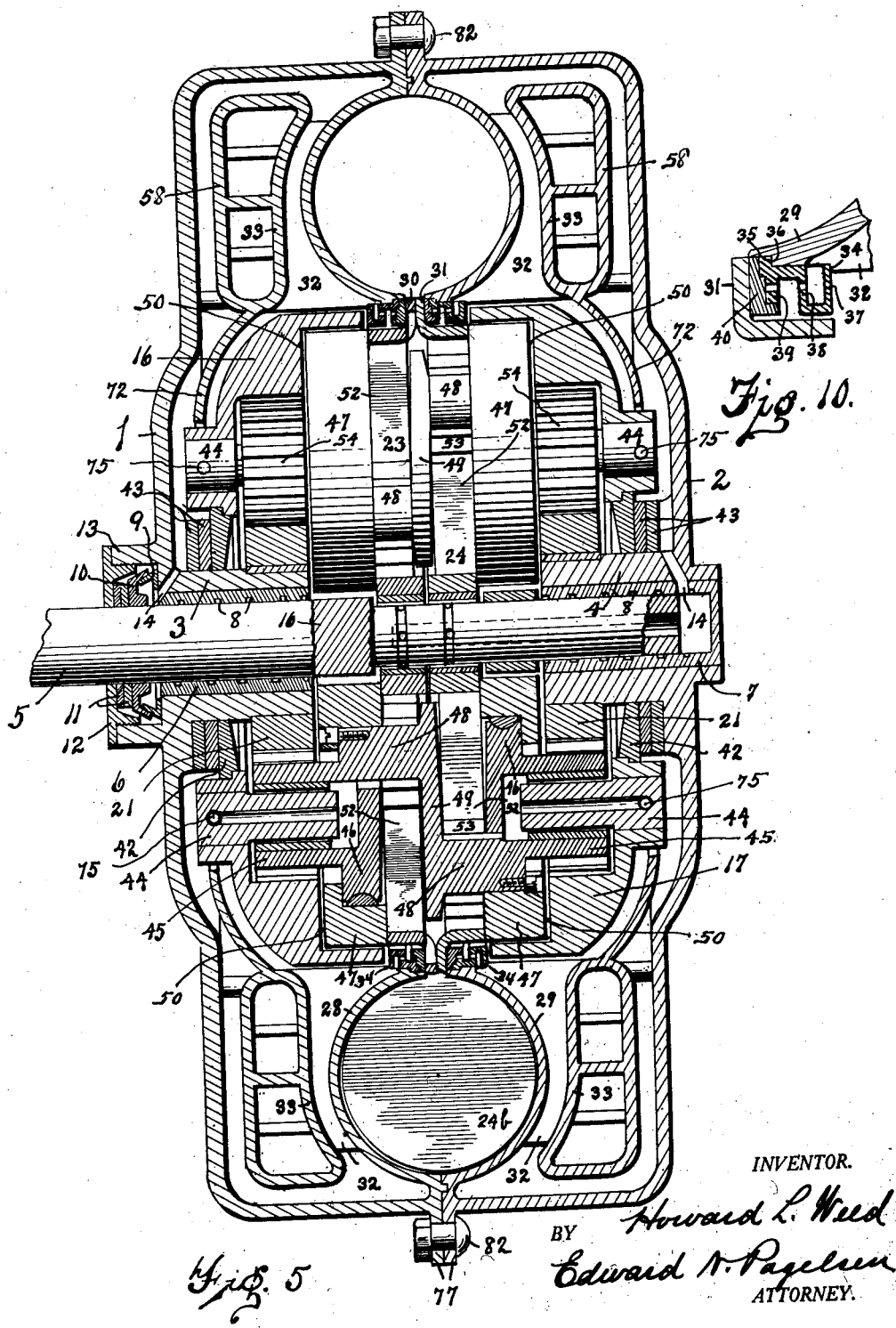

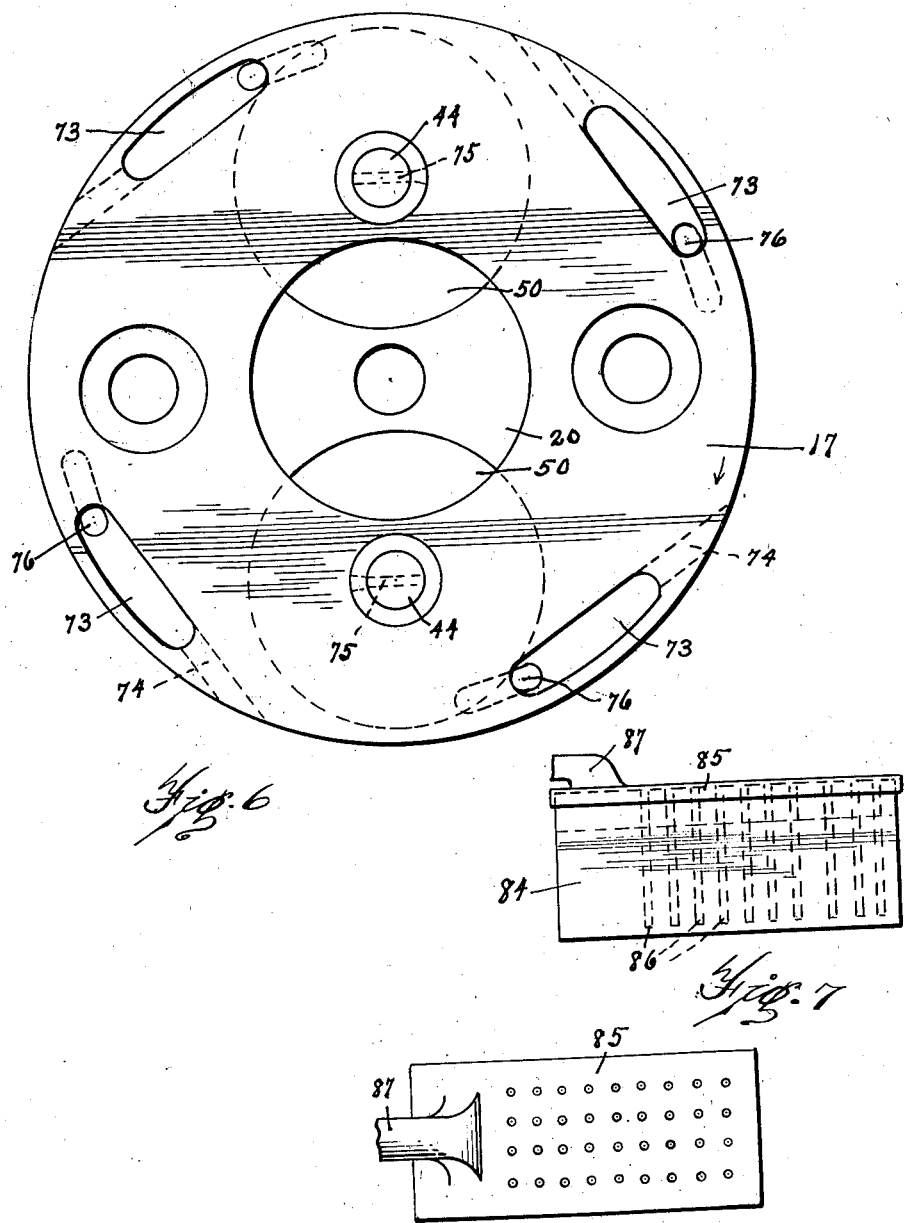

Patented Aug. 27, 1929.

1,726,461

UNITED STATES PATENT OFFICE.

HOWARD L. WEED, OF DETROIT, MICHIGAN.

INTERNAL-COMBUSTION ROTARY ENGINE.

Application filed November 28, 1923. Serial No. 677,367.

This invention consists of a rotary internal combustion engine of the same general character as that shown in my co-pending application Serial Number 348,864, filed January 2, 1920, and like the engine there illustrated it embodies a casing including an annular cylinder, a main shaft mounted in the casing, a pair of rotors movable about the main shaft, and pistons within the cylinder and connected to the rotors and adapted to intermittently transmit force to the rotors because of the expansion of an explosive fluid between pistons on different rotors which causes these pistons to separate and thereby forces one of said pistons to travel faster than the other, these pistons traveling constantly in the same direction but at varying speeds.

It further embodies a crank shaft carrier in the form of a pair of fly wheels mounted on the main shaft, planetary crank shafts rotatably mounted in these fly wheels, bearings slidable in radial slots in the rotors for transmitting the force of the rotors to these crank shafts, and gears for transmitting the force thus applied to the crank shafts, to the fly wheels and to the main shaft.

It further consists in the details of construction illustrated in the accompanying drawings and particularly pointed out in the claims.

In the drawings, Fig. 1 is a side elevation of this improved rotary internal combustion engine, a portion of the casing being broken away to show an air passage. Fig. 2 is an elevation of one half of the casing and cylinder showing the pistons therein, one of the rotors being in section. Fig. 3 is a similar view with the pistons shifted through a part of their travel. Fig. 4 is a longitudinal section of the end of one of the pistons. Fig. 5 is a central transverse section of the engine on the line 5—5 of Fig. 2. Fig. 6 is an elevation of a fly-wheel. Fig. 7 is an elevation and Fig. 8 is a plan of a cooling device. Fig. 9 is a section on the line 9—9 of Fig. 3. Fig. 10 is a section of a packing ring for the rotors and of the spring ring to tension it.

Similar reference characters refer to like parts throughout the several views.

The present engine embodies a pair of half-casings 1 and 2 provided with internal hubs 3 and 4 for the main shaft 5, which extends out through the hub 3. Bearing bushings 6 and 7 are preferably provided with proper helical oil grooves 8 while the bushing 7 has a closed outer end. A packing of any desired character may be provided to prevent leakage at the outer end of the bushing 6. I prefer a conical male bearing ring 9 attached to the casing, a complementary female ring 10 slidable on the shaft and rotatable therewith, and bearing washers 11 pressed against it by a screw plug 12 threaded into the flange 13. Oil ducts 14 are provided at each bushing. The male ring 9 is preferably resilient and split to insure proper pressure at all times.

A fly-wheel 16 is shown integral with the main shaft, while a second fly-wheel 17 is slid onto the shaft and secured to the first by the screws 18 which engage in the spacing bosses 19. These fly-wheels are the carriers for the crank shafts and are formed with recesses 20 (Fig. 6) to receive the stationary or abutment gears 21 which are attached to the hubs 3 and 4.

Mounted to rotate freely on the main shaft 5 are two rotor disks 23 and 24, having pistons $23^a$ and $23^b$ and $24^a$ and $24^b$ on their peripheries respectively. These pistons are provided with removable heads 25 which are grooved to receive the piston rings 26 (Fig. 4). I prefer to have these rings split and position them by means of pins 27.

It may be said at the beginning that the main shaft rotates at uniform speed. The rotors, however, move at regularly varying speeds but always in the same direction so that the pistons of the two rotors approach each other and then separate, to scavenge the cylinder, to draw in the charge, to compress the charge, and then be forced apart under the force of the explosion. It should be further understood that the time which each piston requires to move from or to the position occupied by the next adjacent piston in either direction, is always the time required by the main shaft to rotate ninety degrees. The distances traveled by the central points of the pistons during equal periods of time are indicated by the small circles 57 in Figs. 2 and 3.

As indicated in Figs. 2, 3, 5 and 9, the cylinder is annular and formed of the two parts 28 and 29 which are integral with the two half casings. The edges 30 and 31 of the rotors are reduced and contact with each other, as indicated in Figs. 5 and 9. A series of radial plates 32 extend across from the cylinder to the inner walls 33 of two circumferential air ducts and said plates are integral with the halves of the cylinder and the air ducts, and the inner edges of these plates are notched to form abutments 34 for spring rings such as shown in Fig. 10. These rings may also have circumferential shoulders 35 which engage the shoulder 36 of the cylinder and the resilience of the three radial parts 37, 38 and 39 press the bearing rings 40 against the reduced edges 30 and 31 of the rotors and thus prevent leakage between the rotors and the cylinders.

The fly-wheels are positioned relative to the casing by means of the rings 42 which are supported by washers 43. Each flywheel carries a pair of pins 44 which extend into the ends 45 of the crank shafts. Each crank shaft has a pair of disks 46 on which the small fly-wheels 47 are secured, a pair of crank pins 48 and a connecting member 49 between the crank pins. The rotors are recessed to receive the connecting member 49 and the main fly-wheels have recesses 50 to receive the small planetary fly-wheels.

The advantages arising out of the use of these planetary fly-wheels 47 are that they insure smooth action of the scotch yoke and through this they insure smoothness of action of the rotors notwithstanding their varying speeds. These small fly-wheels rotate at very high constant speeds and cause a constant and uniform pull between the gears. It will be noted that these planetary crank shafts have two diametrically opposed crank pins and that therefore the crank shafts are balanced. The small fly-wheels thereon are not counterbalances but merely insure evenness of action.

The rotors are also formed with radial slots 52 through which the crank pins 48 extend and bearing blocks 53 for these crank pins are slidable in these slots in the manner of the well known scotch yoke. Gears 54 on the ends of the planetary crank shafts mesh with the abutment gears 21. I prefer to mount the wearing plates 55 in the slots 52 of the rotors.

As the pistons approach each other and then separate under the force of the explosion of the fuel, there is a tendency of first one rotor and then the other to stop and even turn back, but the abutment gears on the casing and the gears on the crank shafts render this impossible. Fig. 3 shows the parts at the instant of the explosion, the fuel being compressed between the pistons 24$^a$ and 23$^b$. The spark plug 56 receives current from any desired source and as the crank shafts rotate clockwise in Fig. 3, it will be seen that the crank pins are just going over the center.

I have shown a series of small circles 57, each of which indicates the position of the center of each piston at predetermined intervals of time. That is, the time required for the piston 24$^a$ to move to the position occupied by the piston 23$^b$ is the same as the time required by the latter to move to the position of piston 24$^b$. The time interval between adjacent points 57 is always the same.

The casing of this engine is filled with oil which is thrown outward by centrifugal force into the space between the cylinder and the inner wall 33 of two circumferential air passages. It then flows outward and then inward between the outer walls 58 of these air passages and along the inner faces of the casing to the hub. As it flows inward, it carries with it the heat of the cylinder, giving off much of this heat to the walls 33 and 58 of the air passages. The plates 32 also conduct heat from the cylinder to these air passages and to the oil. Oil passages or grooves are provided as shown at each bearing surface so that the engine is fully lubricated.

Air enters the air passages at 60 and passes around in both directions to the ports 61 which connect to the cylinder and permit air to flow through the space between the pistons 23$^a$ and 24$^b$ during the time of the exhaust, which is beginning when the pistons are in the positions shown in Fig. 3. The exhaust passage 62 is provided with an ejector nozzle 63 which causes a free flow of air through the inlet passage 60, the ports 61 and through the pipe 64. A carburetor is connected to the intake passage 65 and any desired type may be used. Air for this carburetor is preferably taken from the passages 66, shown in Figs. 1 and 9, which air has been heated by the fins 67 in the air passages and the walls 33 and 58 thereof. The cylinder is therefore kept at a proper even temperature throughout by means of the plates 32 and the lubricating oil which transmit the heat to the walls and fins of the air passages and the oil and the air passages are kept sufficiently cool by means of the air drawn through them by the carburetor and by the ejector 63.

As the connection between the pipe 64 and the ports 61 is interrupted during only very short periods of time because of the shortness of the piston heads and the length of these ports 61, and because of the aspirating effect of the exhaust flowing through the exhaust pipe 70, a substantially continuous and very plentiful flow of air is maintained through the air passages, which flow of air carries off the heat of the cylinder. The curvature of the air passages and of the fins therein insures perfect contact between them and the air rushing through and thus increases the efficiency of this cooling device.

Referring to Figs. 5 and 9, a pair of flanges 72 are shown integral with the casing. The lubricant passes inwardly toward the main shaft between these flanges and the outer casing until it reaches the large fly-wheels 16 and 17. It then flows outwardly by centrifugal force and a large proportion thereof reaches and enters the pockets 73 (Fig. 6). The inertia of oil causes it to flow through the passages 74 to the peripheries of the fly-wheels, from which the oil is thrown out into the spaces between the cylinder and air passages to again take up a portion of heat and transfer it to the air passage.

Another portion of the oil which passes inward between the flanges 72 and casing reaches the small holes 75 (Fig. 5) in the pins 44 carried by the main fly-wheel, flows through the longitudinal bores of these pins to lubricate the crank pins and scotch yoke and to thereafter pass to the spaces around the crank shafts and gears and also passes to the rotors. It not only passes out to a space between the rotors but also between them and the packing rings, properly lubricating and cooling the various parts. Oil passages are shown where required but these may be changed as desired. As the space within the casing is practically filled by the large fly-wheels, the rotors and the parts carried thereby, the amount of oil required to fill the casing is not large.

Any excess of oil which collects in the pockets 50 for the small fly-wheels 47 passes off through the passages 76 to the pockets 73 shown in Fig. 6. In order to balance the pressure of oil on both sides of the cylinder a passage such as shown at the top of Fig. 9 may be provided. This is formed by drilling the bosses 78 on the flanges 77 of the cylinder to receive a pin 79 which pin is formed with a passage 80 connecting with the the small openings 81 in the cylinder. The flanges of the cylinder are normally secured together by bolts 82.

In order to supply cool air to the inner walls 33 and 58 and fins 67 of the circumferential air passages, the humidifier shown in Figs. 7 and 8 may be connected to one or both of the intake openings 60. A receptacle 84 is provided with a cover 85 which is perforated to receive the vertical tubes 86 through which air passes down into water contained in the receptacle. This air rises and passes out through the discharge pipe 87 attached to the cover, which pipe leads directly to an inlet 60.

The operation of this engine is substantially the same as that of my said co-pending application. The details of construction may be changed by those skilled in the art without departing from the spirit of my invention as set forth in the following claims.

I claim:—

1. In an internal combustion engine, a casing including an annular cylinder, a main shaft mounted in the casing, a pair of rotors mounted on the main shaft and freely rotatable thereon, a fly-wheel attached to the main shaft on one side of the rotors and a second fly-wheel on the other, means to connect the fly-wheels, a pair of pistons within the cylinder connected to the periphery of each rotor, a plurality of crank shafts mounted in said fly-wheels and having crank pins extending through slots in the rotors, bearing blocks for the crank pins slidably mounted in the slots in the rotors to transmit power therefrom to the crank shafts, gears mounted on the crank shafts, and stationary gears meshing with the gears on said crank shafts.

2. In an internal combustion engine, a casing including an annular cylinder, a main shaft mounted in the casing, a pair of spaced and connected fly-wheels mounted on the shaft and rotatable therewith, a pair of rotors mounted on the shaft between the fly-wheels and having slots to permit the passage of the connecting means for said fly-wheels and to permit a limited rotation between the fly-wheels and rotors and between the rotors, pairs of pistons within the cylinder attached to each rotor, a planetary crank shaft having a pair of oppositely disposed crank pins, said crank shafts being journaled in said fly-wheels, each of said rotors having a radial slot, a slidable bearing for a crank pin in each of said slots, and gears between the casing and crank shafts.

3. In an internal combustion engine, a casing including an annular cylinder, a main shaft mounted in the casing, a pair of rotors mounted on the main shaft and freely rotatable thereon, a fly-wheel attached to the main shaft on one side of the rotors and a second fly-wheel on the other, means to connect the fly-wheels, a pair of pistons within the cylinder connected to each rotor, a plurality of crank shafts mounted in said fly-wheels and having crank pins extending through slots in the rotors, bearing blocks for the crank pins slidably mounted in the slots in the rotors to transmit power therefrom to the crank shafts, gears mounted on the crank shafts, stationary gears meshing with the gears on said crank shafts, and a pair of fly-wheels mounted on each crank shaft, said fly-wheels on the main shaft being recessed to receive the fly-wheels on the crank shafts.

4. In an internal combustion engine, a casing and an annular cylinder, a main shaft mounted in the casing, a pair of rotors, a fly-wheel attached to the main shaft on each side of the rotors, planetary crank shafts rotatably mounted in the fly-wheels, said rotors having slots to permit the passage of the crank shafts, and bearing blocks slidably mounted in said slots to transmit power to the crank pins of the crank shafts.

5. In an internal combustion engine, a casing and an annular cylinder, a main shaft mounted in the casing, a pair of rotors, a fly-wheel attached to the main shaft on each side of the rotors, planetary crank shafts rotatably mounted in the fly-wheels, said rotors having slots to permit the passage of the crank shafts, and bearing blocks slidably mounted in said slots to transmit power to the crank pins of the crank shafts, each of the crank shafts having two crank pins, one for each rotor, and a transverse member connecting said pins, said rotors being recessed to receive said transverse members between them.

6. In an internal combustion engine, a casing and an annular cylinder, a main shaft mounted in the casing, a pair of rotors, a fly-wheel attached to the main shaft on each side of the rotors, planetary crank shafts rotatably mounted in the fly-wheels, said rotors having slots to permit the passage of the crank shafts, bearing blocks slidably mounted in said slots to transmit power to the crank pins of the crank shafts, each of the crank shafts having two crank pins, one for each rotor, a transverse member connecting said pins, said rotors being recessed to receive said transverse members between them, and a pair of smaller fly-wheels mounted on each crank shaft outside of the crank pins, said main fly-wheels being recessed to receive the smaller fly-wheels.

7. In an internal combustion engine, a casing and an annular cylinder, a main shaft mounted in the casing, a pair of spaced fly-wheels attached to the main shaft, a pair of rotors between said fly-wheels, pistons within the cylinder attached to said rotors, said rotors having slots, posts and screws extending between the fly-wheels through said slots, planetary crank shafts mounted in said fly-wheels, and means connecting the crank pins of said crank shafts to the rotors.

8. In an internal combustion engine, a casing and an annular cylinder, a main shaft mounted in the casing, a pair of rotors, a fly-wheel attached to the main shaft on each side of the rotors, planetary crank shafts rotatably mounted in the fly-wheels, said rotors having slots to permit the passage of the crank shafts, and bearing blocks slidably mounted in said slots to transmit power to the crank pins of the crank shafts, each of the crank shafts having two crank pins, one for each rotor, and a transverse member connecting said pins, said rotors being recessed to receive said transverse members between them, each of said crank shafts having crank pins for both of said rotors.

9. In an internal combustion engine, a casing and an annular cylinder, a main shaft mounted in the casing, a pair of rotors, a fly-wheel attached to the main shaft on each side of the rotors, planetary crank shafts rotatably mounted in the fly-wheels, said rotors having slots to permit the passage of the crank shafts, and bearing blocks slidably mounted in said slots to transmit power to the crank pins of the crank shafts, each of the crank shafts having two crank pins, one for each rotor, and a transverse member connecting said pins, said rotors being recessed to receive said transverse members between them, and a pair of fly-wheels mounted on each crank shaft.

10. In a rotary internal combustion engine, the combination of an annular cylinder, means to support the same, a pair of rotors, pistons within the cylinder and connected to said rotors, a packing ring engaging the outer side of each rotor at its periphery, and a resilient ring to press each packing ring against its rotor and comprising a plurality of radial members connected by cylindrical members, one edge of the outermost of the radial members bearing against shoulders formed on said supporting means.

11. In a rotary internal combustion engine, the combination of an annular cylinder, means to support the same, a pair of rotors, pistons within the cylinder and connected to said rotors, a packing ring engaging the outer side of each rotor at its periphery, and a resilient ring to press each packing ring against its rotor and comprising a plurality of radial members connected by cylindrical members, one edge of the outermost of the radial members bearing against shoulders formed on said supporting means, said packing rings and resilient rings being formed with axial passages for lubricant.

12. In a rotary internal combustion engine, the combination of an annular cylinder, a complete and continuous annular air passage adjacent each side thereof, plates connecting the inner walls of said passage to the cylinder, said air passages having discharge ports connecting to said cylinder and diametrically opposite inlet ports, an exhaust passage and scavenging ports connecting to said cylinder, and an ejector connecting the exhaust passage and the scavenging port to draw air into the cylinder from the air passages.

13. In a rotary internal combustion engine, the combination of an annular cylinder, a complete and continuous annular air passage adjacent each side thereof, plates connecting the inner walls of said passage to the cylinder, said air passages having discharge ports connecting to said cylinder and diametrically opposite inlet ports, an exhaust passage and scavenging ports connecting to said cylinder, an ejector connecting the exhaust passage and the scavenging port to draw air into the cylinder from the air passages, and a series of fins extending inwardly from the walls of said air passages to communicate heat to the air flowing through the passages.

14. In a rotary internal combustion engine, the combination of an annular cylinder, a complete and continuous annular air passage adjacent each side thereof, plates connecting the inner walls of said passage to the cylinder, said air passages having discharge ports connecting to said cylinder and diametrically opposite inlet ports, an exhaust passage and scavenging ports connecting to said cylinder, an ejector connecting the exhaust passage and the scavenging port to draw air into the cylinder from the air passages, and a humidifier connected to the intake opening of the air passage to supply cool air thereto whereby the heat of the cylinder may be reduced.

15. In a rotary internal combustion engine, the combination of an annular cylinder, a complete and continuous annular air passage adjacent each side thereof, plates connecting the inner walls of said passage to the cylinder, said air passages having discharge ports connecting to said cylinder and diametrically opposite inlet ports, an exhaust passage and scavenging ports connecting to said cylinder, and an ejector connecting the exhaust passage and the scavenging port to draw air into the cylinder from the air passages, said cylinder having a fuel intake passage adapted to connect to a carbureter and said air passages having discharge passages adapted to connect to the carbureter to supply heated air thereto.

16. In a rotary internal combustion engine, the combination of an annular cylinder and a casing to support the same, an annular air passage within the casing on each side of said cylinder and spaced from both the casing and cylinder to leave passages for lubricating oil, plates between the cylinder and the walls of the air passage to conduct heat from one to the other and to the oil passing between them, rotors and flywheels within the casing to cause the oil to flow outward to the cylinder by centrifugal force, and flanges within the casing to form passages for the inward flow of the oil.

HOWARD L. WEED.